US011944237B2

United States Patent
Thomas et al.

(10) Patent No.: US 11,944,237 B2
(45) Date of Patent: Apr. 2, 2024

(54) BLENDER

(71) Applicant: Breville PTY LIMITED, Alexandria (AU)

(72) Inventors: Mark Thomas, Alexandria (AU); Gregory Upston, Ridgewood (AU); Warren Preston, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 922 days.

(21) Appl. No.: 16/964,482

(22) PCT Filed: Dec. 21, 2018

(86) PCT No.: PCT/AU2018/051378
§ 371 (c)(1),
(2) Date: Jul. 23, 2020

(87) PCT Pub. No.: WO2019/144177
PCT Pub. Date: Aug. 1, 2019

(65) Prior Publication Data
US 2021/0052113 A1    Feb. 25, 2021

(30) Foreign Application Priority Data

Jan. 24, 2018    (AU) .............................. 2018900232

(51) Int. Cl.
*A47J 43/07*     (2006.01)
*B01F 35/00*     (2022.01)
(Continued)

(52) U.S. Cl.
CPC ......... *A47J 43/0727* (2013.01); *B01F 35/189* (2022.01); *B01F 35/45* (2022.01); *A47J 43/0716* (2013.01); *B01F 2035/351* (2022.01)

(58) Field of Classification Search
CPC ............... A47J 43/0716; A47J 43/0727; B01F 2035/351; B01F 35/189; B01F 35/45
See application file for complete search history.

(56) References Cited

U.S. PATENT DOCUMENTS

| 9,993,114 B2* | 6/2018 | Thomas | ................. B01F 35/45 |
| 2015/0313414 A1 | 11/2015 | Gerard et al. | |
| 2018/0132664 A1* | 5/2018 | Kim | ..................... A47J 43/046 |

FOREIGN PATENT DOCUMENTS

| CN | 106308575 A | 1/2017 |
| CN | 206213946 U | 6/2017 |

(Continued)

OTHER PUBLICATIONS

Chinese Office Action dated Apr. 5, 2023 for Application No. 201880089450.9.

(Continued)

*Primary Examiner* — Dana Ross
*Assistant Examiner* — Joe E Mills, Jr.
(74) *Attorney, Agent, or Firm* — Patterson + Sheridan, LLP

(57) ABSTRACT

A container (100) within which a food product is to be processed. The container (100) includes: a hollow body (101) providing an interior chamber (110) to receive the product and within which the product is processed, the body (101) having a rim portion (104) surrounding a body top opening (106); a removable lid (107) sealingly associated with the rim portion (104) to close the top opening (106), the lid (107) having: a base (111) sealingly associated with the rim portion (104), the base (111) having a base opening (115) providing access to the chamber (110) and a sealing surface (157) surrounding the base opening (115), a removable valve assembly (112) located in the base opening (115) and sealingly associated with the base (111) to close the base opening (115), the valve assembly (112) including: a main part (122) associated with the base (111) to removably secure the valve assembly (112) in the base opening (115), a seal (123) mounted on the main part (122) and engaging the sealing surface (157), an air opening (131) in the main part (122) providing for air flow from the chamber (110) to exterior of the container (100), a valve (132) operatively associated with the air opening (131) to close the air opening (131) to at least inhibit air flow from exterior of the container (100) to said chamber (110) but permit air flow from the chamber (110) to the exterior, and wherein a cavity (156) is provided between the base (111) and main part (122), leading to said seal (123), with the cavity (156) including a (Continued)

first cavity portion (151) and a second cavity portion (153), with the first cavity portion (151) being configured relative to the second cavity portion (153) to at least partly dissipate kinetic energy of liquid being propelled from the interior (110) into the cavity (156).

9 Claims, 16 Drawing Sheets

(51) Int. Cl.
*B01F 35/30* (2022.01)
*B01F 35/45* (2022.01)

(56) References Cited

FOREIGN PATENT DOCUMENTS

| | | |
|---|---|---|
| CN | 206434225 U | 8/2017 |
| CN | 206910246 U | 1/2018 |
| FR | 3022448 A1 | 12/2015 |
| RU | 2282456 C2 | 8/2006 |
| WO | 2010106284 A2 | 9/2010 |

OTHER PUBLICATIONS

U.S. Appl. No. 16/964,482, filed Jul. 23, 2020.
International Search Report for Application No. PCT/AU2018/051378 dated Apr. 11, 2019.

\* cited by examiner

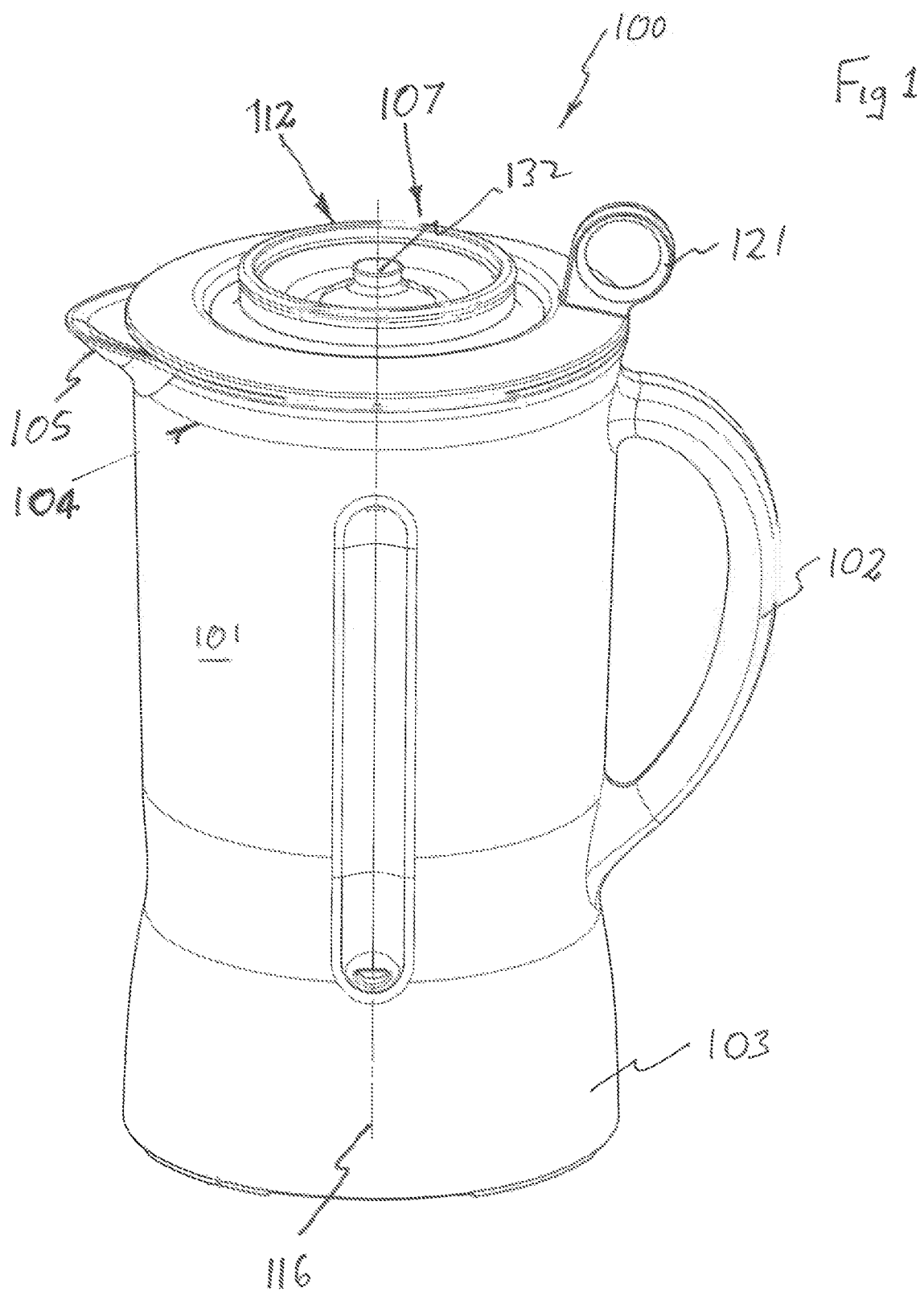

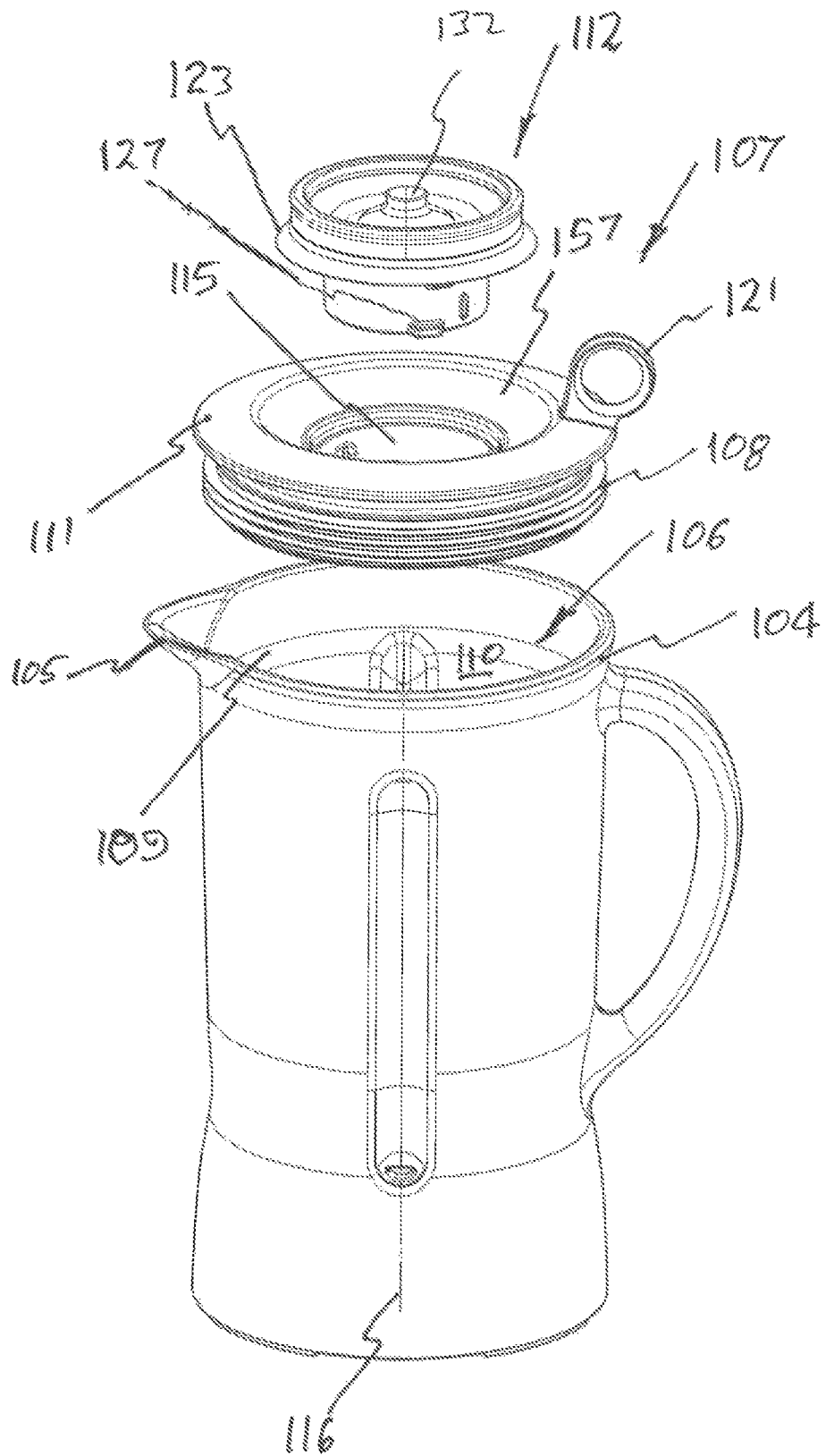

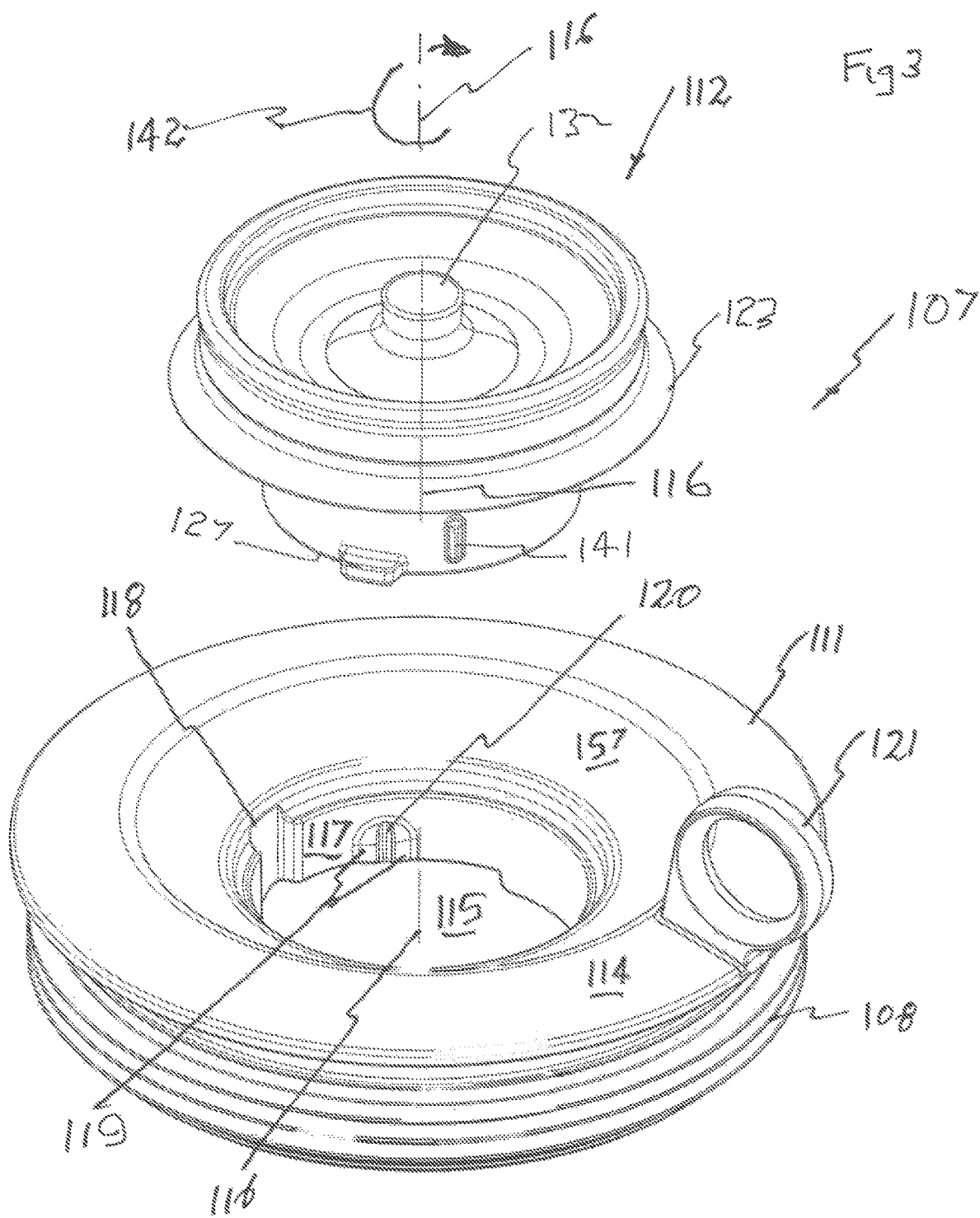

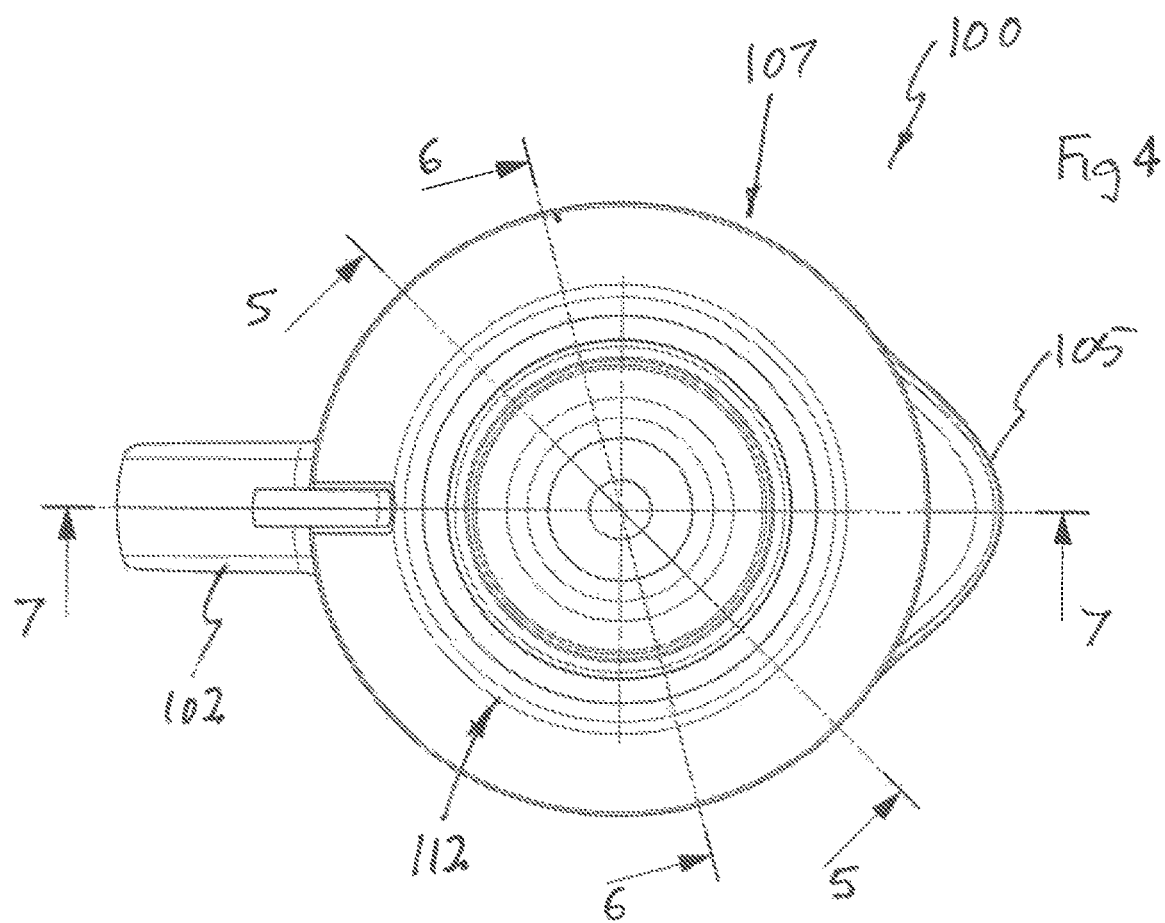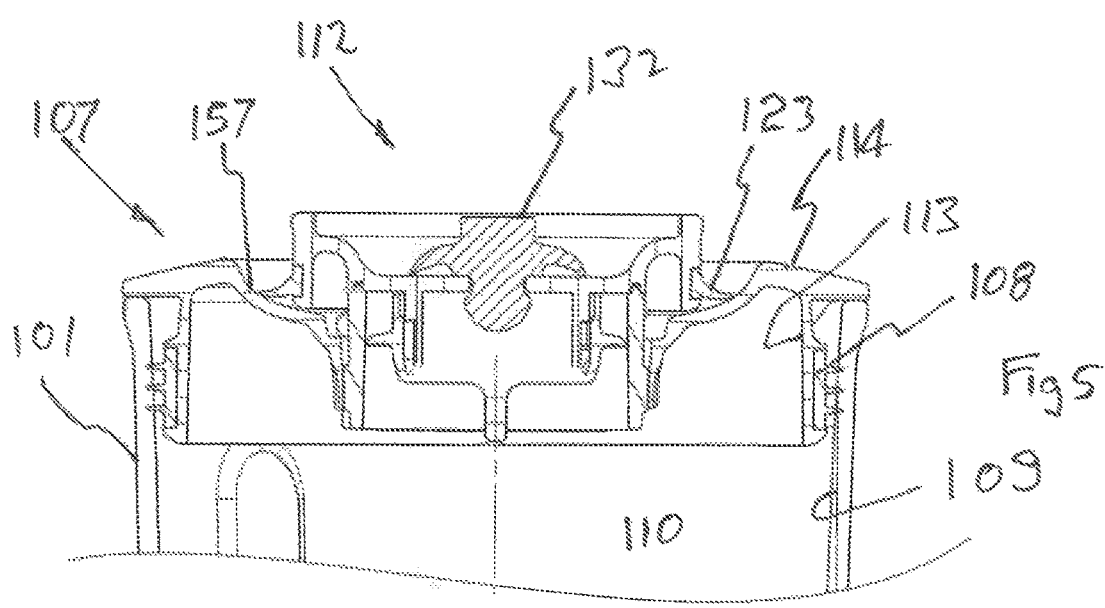

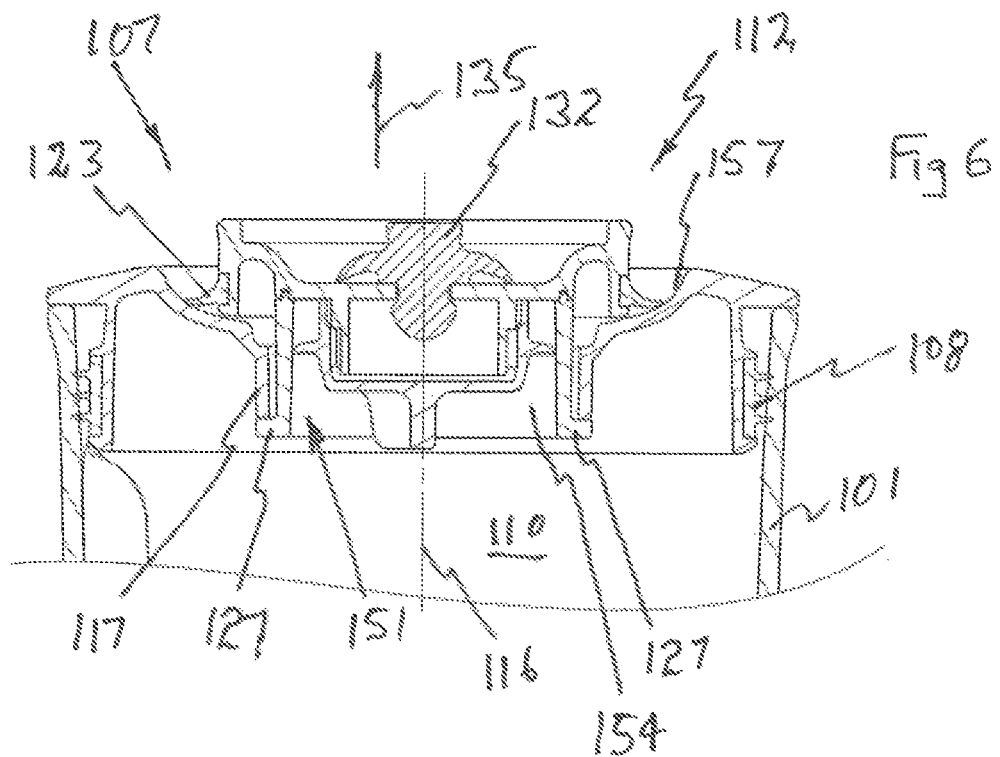
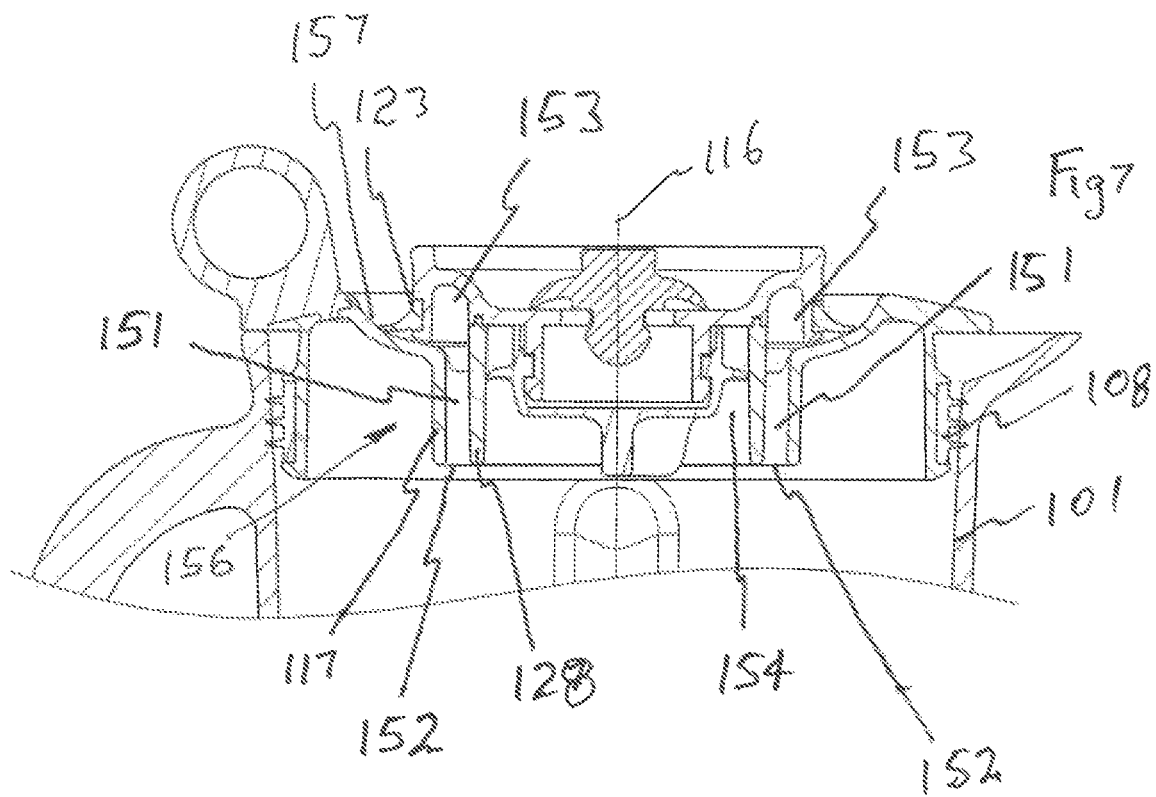

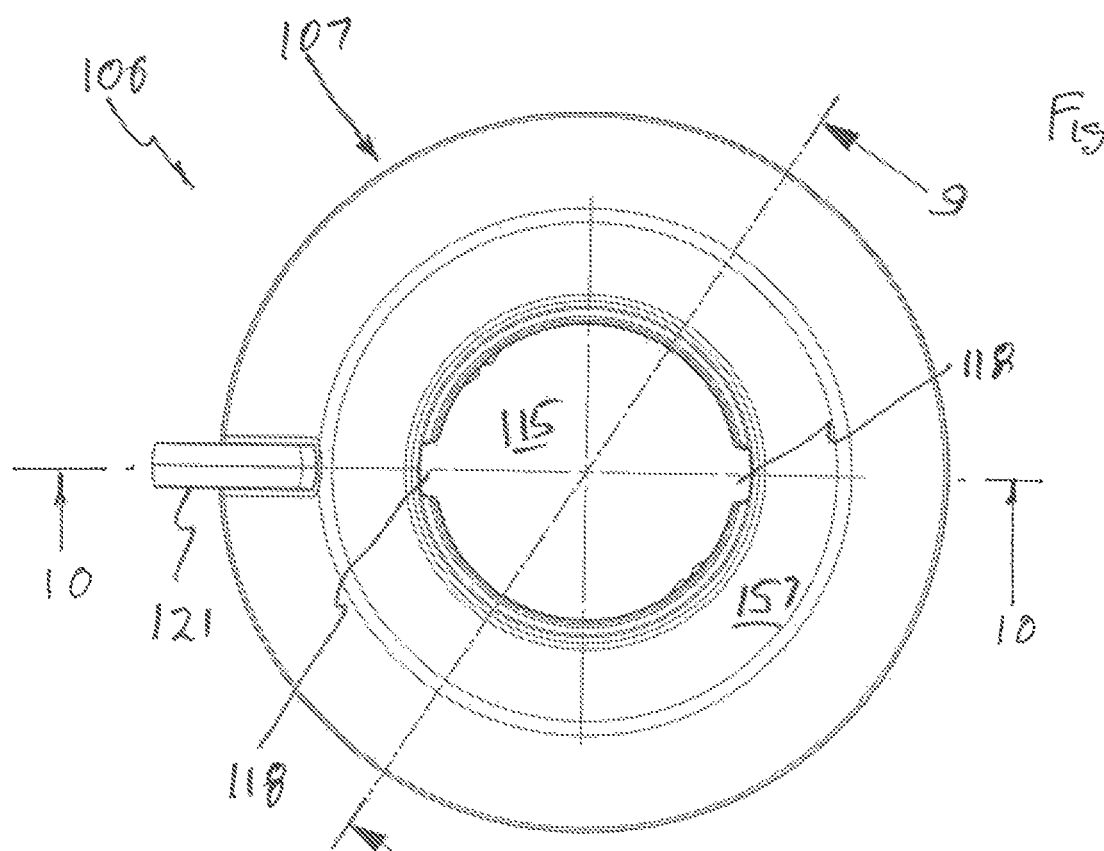
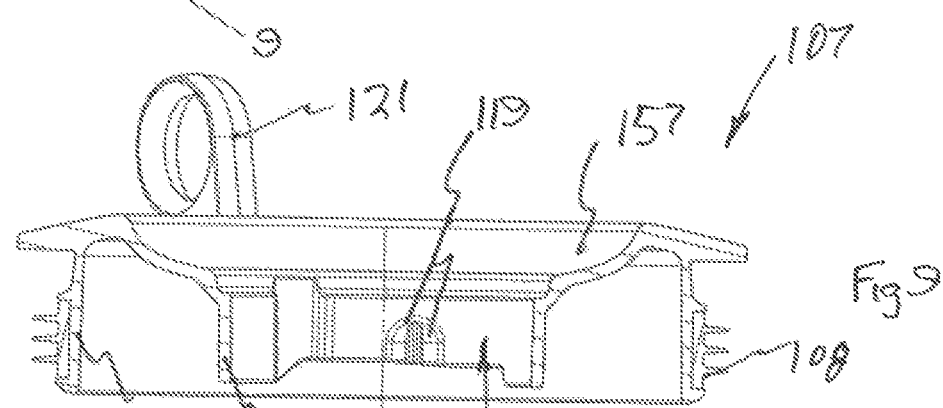
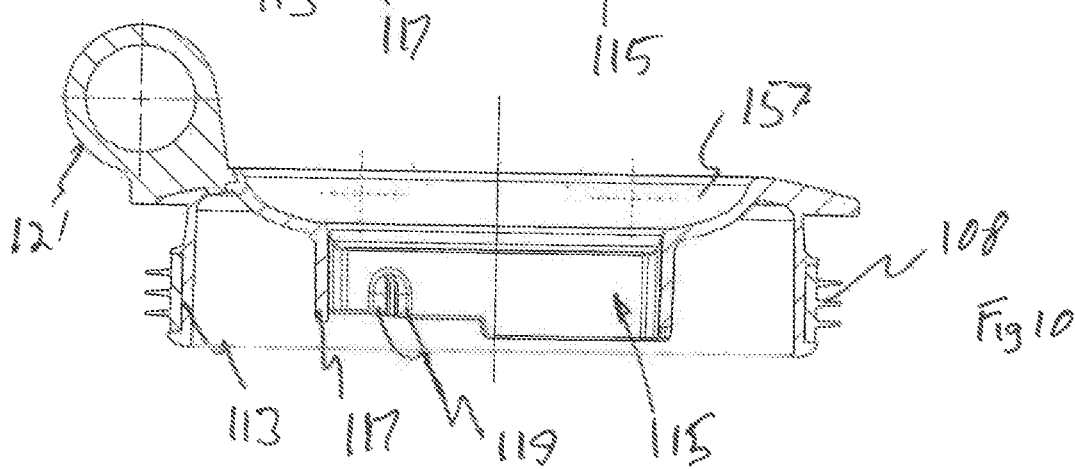

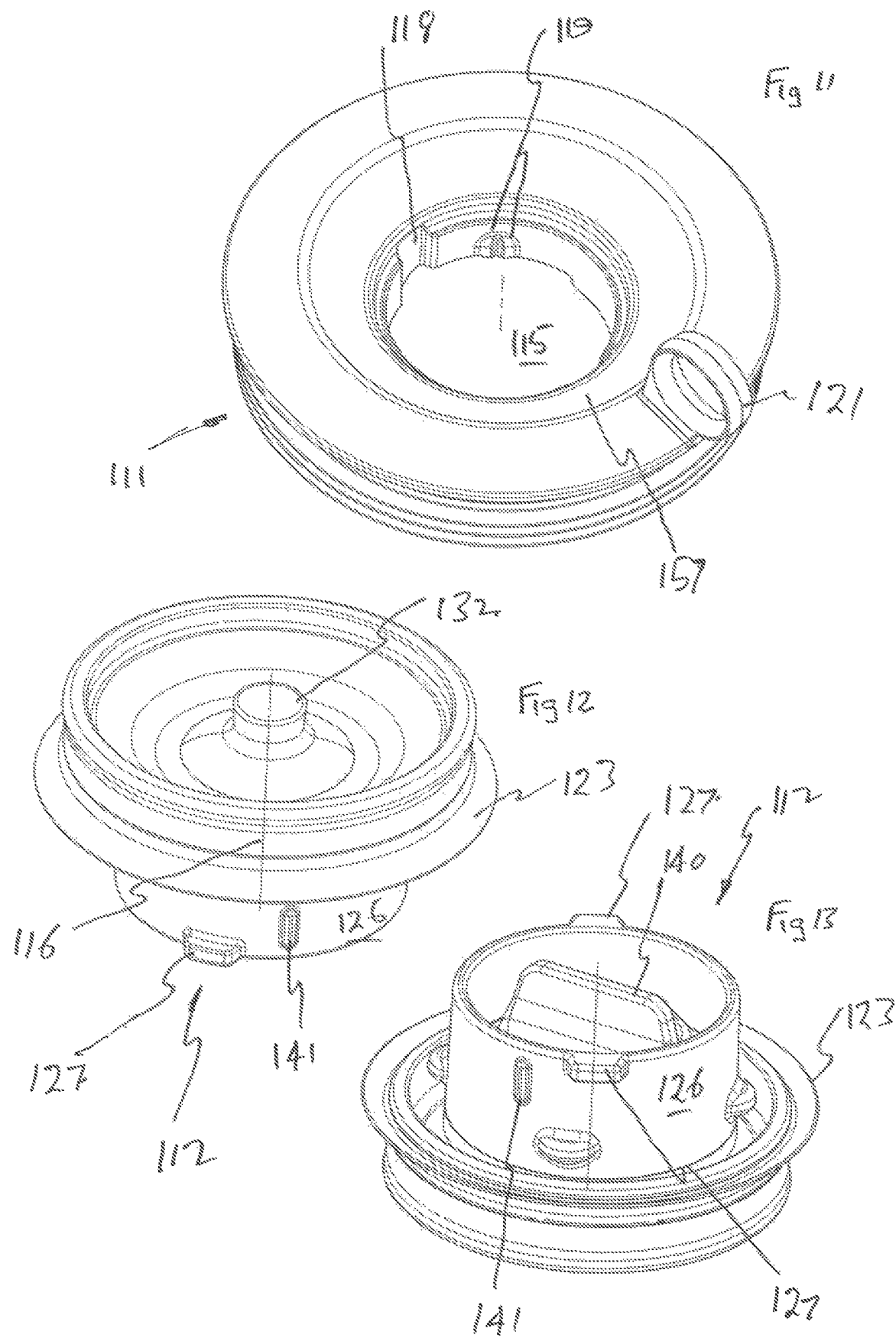

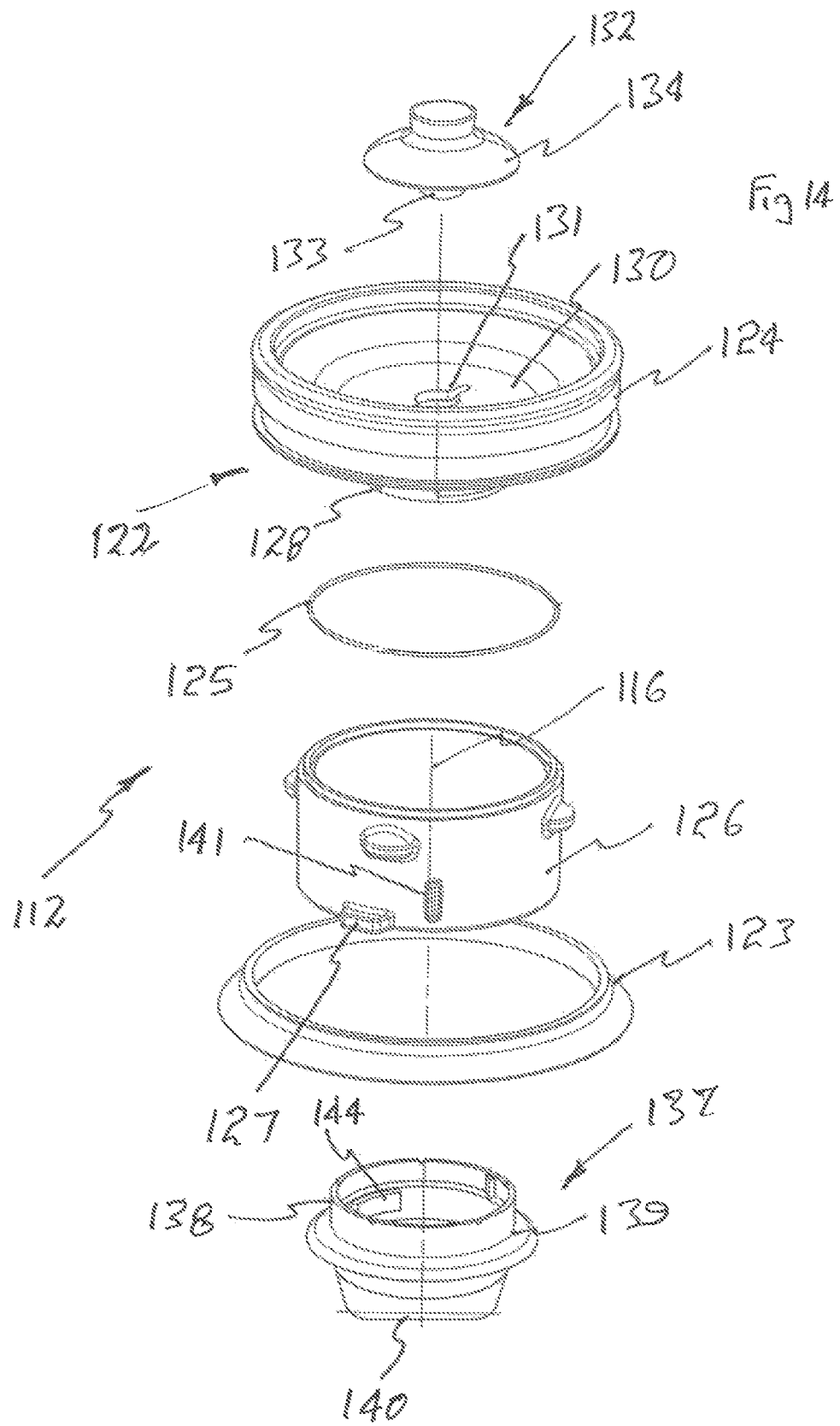

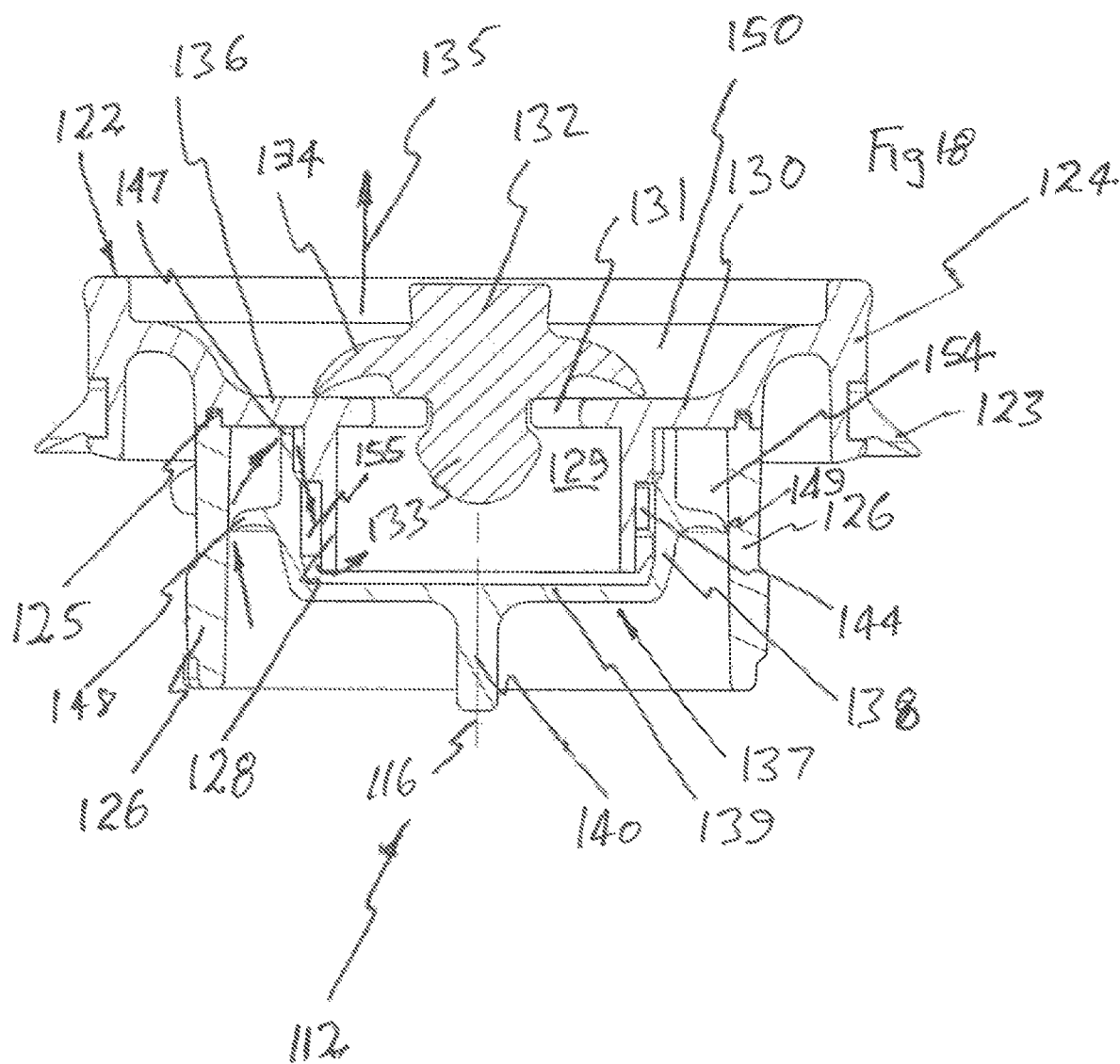

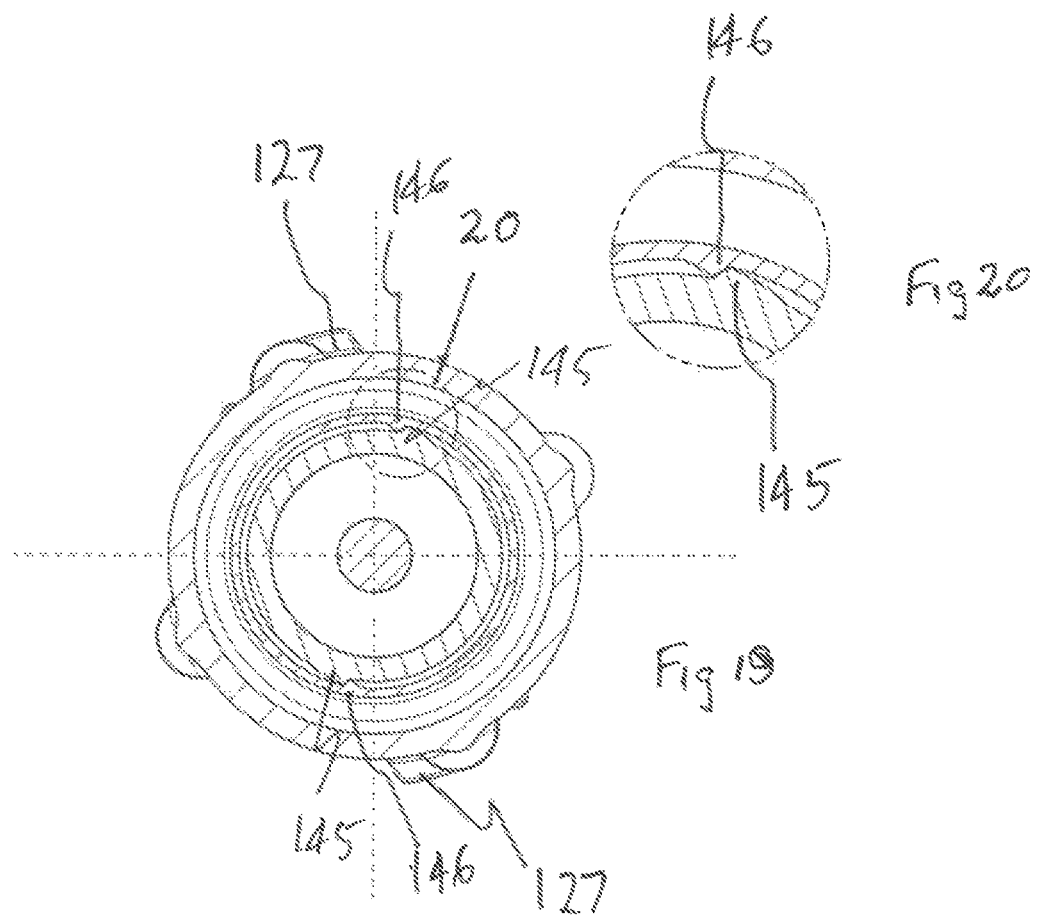

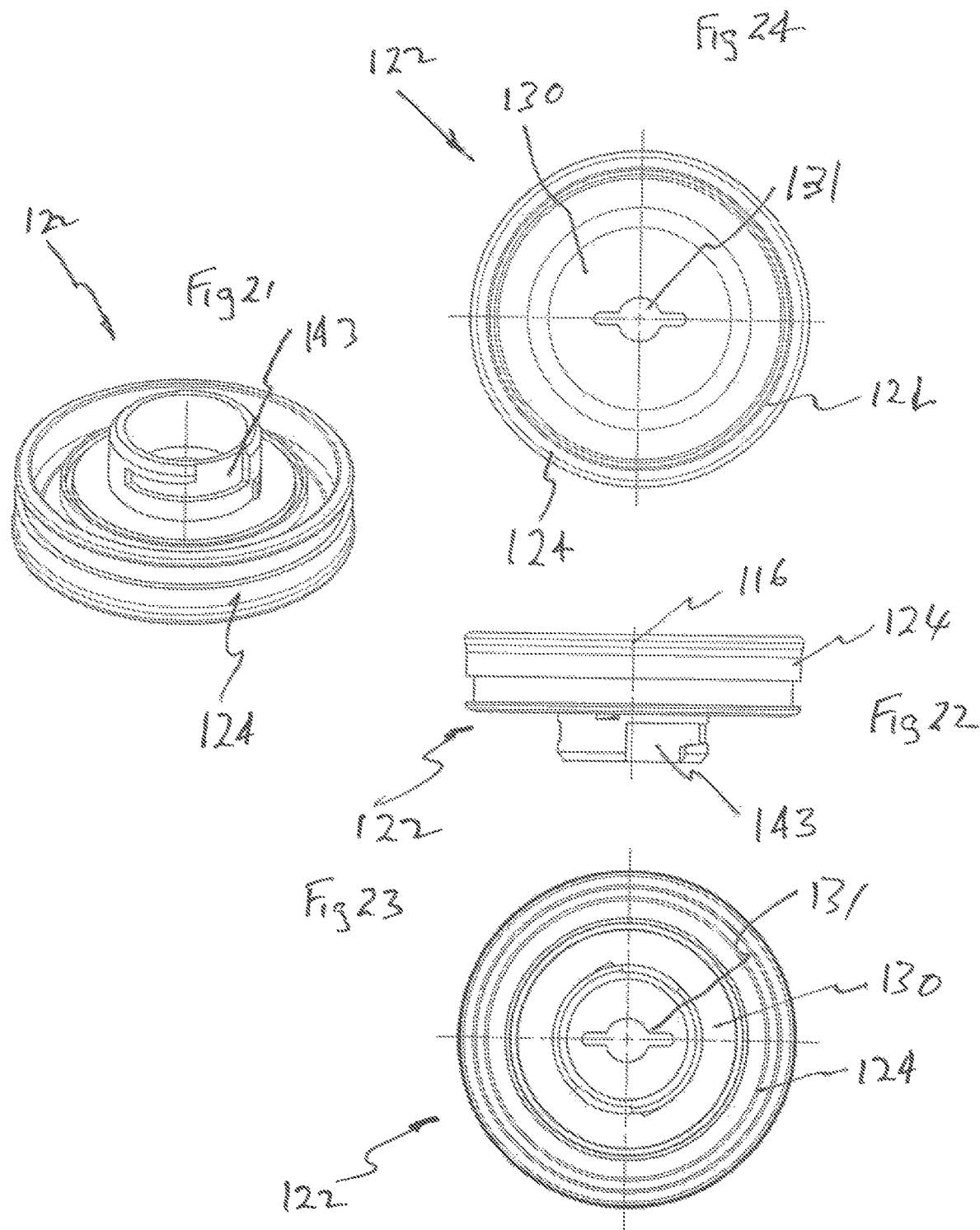

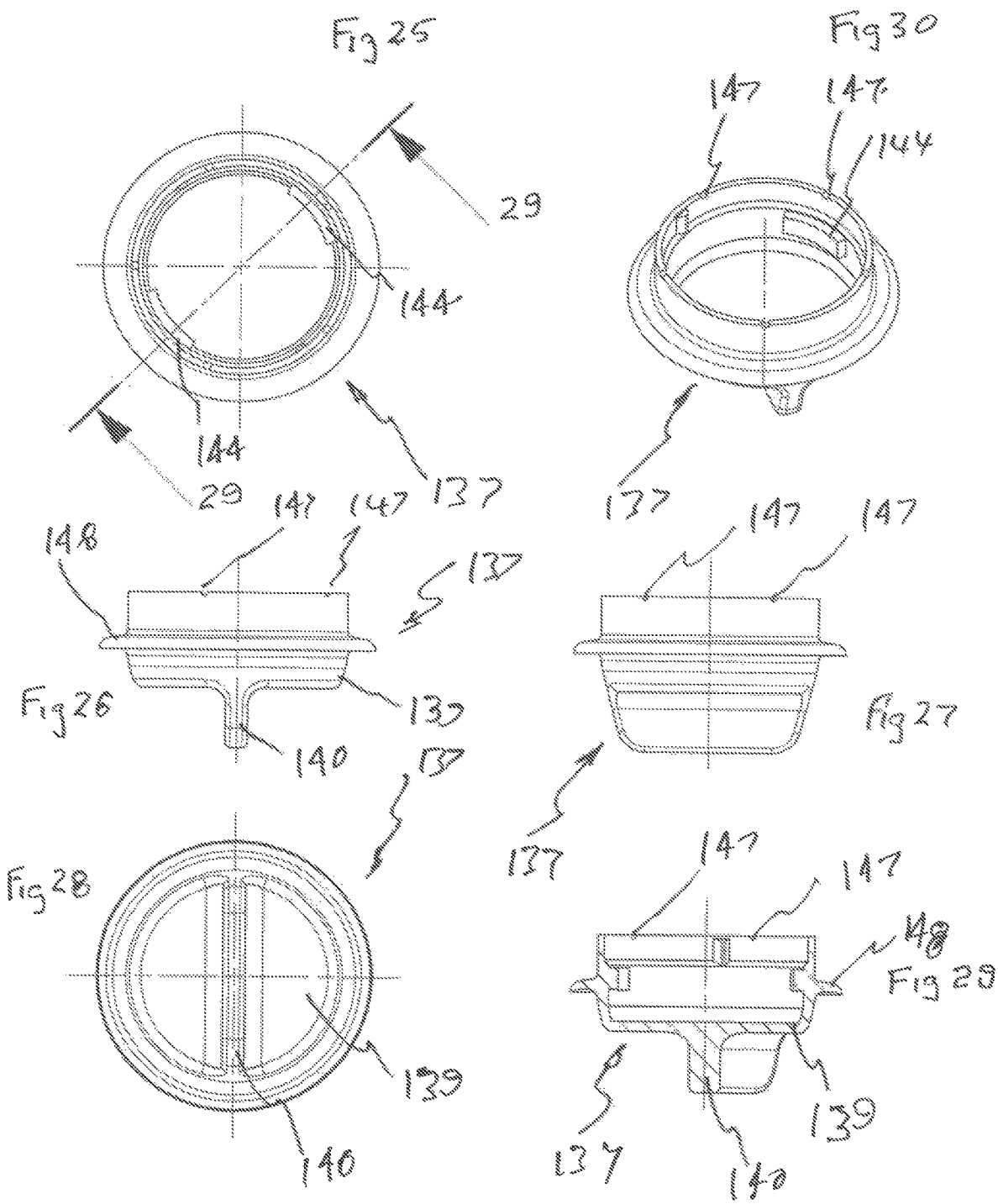

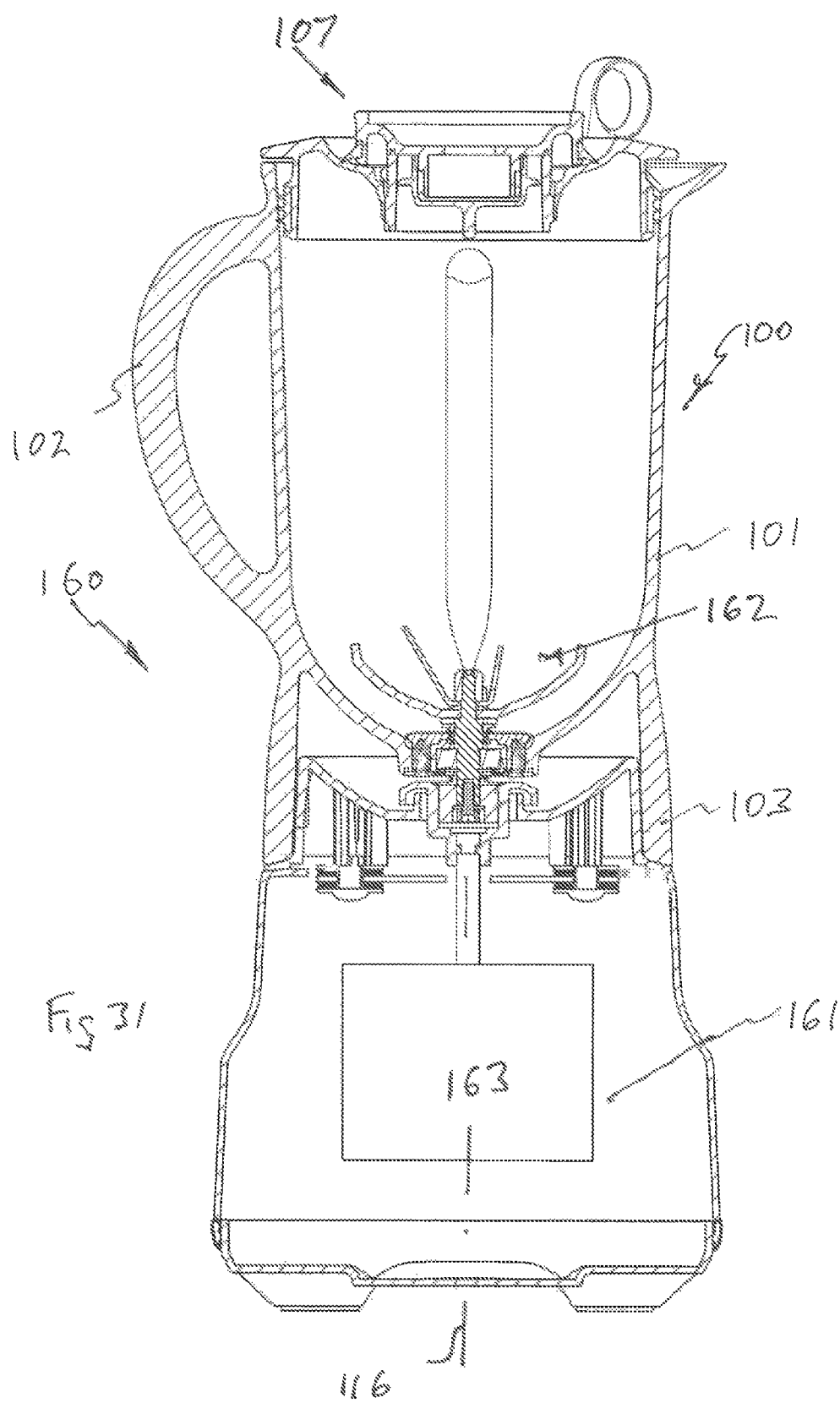

BLENDER

FIELD

The present invention relates to food processors, and more particularly but not exclusively to blenders and juicers.

BACKGROUND

Oxidation causes fruits and vegetables to spoil quickly. When fruits and vegetables are blended they are broken down into smaller pieces. Thus, surface area of the broken down fruits and vegetables has increased. The increase in surface area allows more contact with oxygen and oxidises the food stuff even faster.

To minimise oxidation a "vacuum device" is attached to the top of the blender lid valve cup to remove air from within the interior of the container (jug), to thereby reduce the amount of oxygen exposed to the product being processed.

A base lid is attached to the jug to prevent the agitated fluid from expelling. During food preparation, it is desirable to remove the lid valve cup to add the ingredients into the jug during operation. However, when there are large forces created by agitation, the fluid escapes the seal between the lid valve cup and the base lid.

A disadvantage of previous food processors is that the lid valve cup may not prevent liquid leaving the jug during operation.

OBJECT

It is the object of the present invention to overcome or substantially ameliorate the above disadvantage.

SUMMARY OF INVENTION

There is disclosed herein a container within which a food product is to be processed, the container including:
a hollow body providing an interior chamber to receive the product and within which the product is processed, the body having a rim portion surrounding a body top opening;
a removable lid sealingly associated with the rim portion to close the top opening, the lid having:
  a base sealingly associated with the rim portion, the base having a base opening providing access to the chamber and a sealing surface surrounding the base opening,
  a removable valve assembly located in the base opening and sealingly associated with the base to close the base opening, the valve assembly including:
    a main part associated with the base to removably secure the valve assembly in the base opening,
    a seal mounted on the main part and engaging the sealing surface,
    an air opening in the main part providing for air flow from the chamber to exterior of the container,
    a valve operatively associated with the air opening to close the air opening to at least inhibit air flow from exterior of the container to said chamber but permit air flow from the chamber to the exterior, and wherein
    a cavity is provided between the base and main part, leading to said seal, with the cavity including a first cavity portion and a second cavity portion, with the first cavity portion being configured relative to the second cavity portion to at least partly dissipate kinetic energy of liquid being propelled from the interior into the cavity.

Preferably, the first cavity portion has a transverse width, and the second cavity portion has a transverse width, with the transverse width of the second cavity portion being greater than the transverse width of the first cavity portion.

Preferably, the second cavity portion has a volume greater than the first cavity portion.

Preferably, the seal engages said sealing surface laterally of the second cavity portion.

Preferably, the container has a generally central longitudinal axis, with said first cavity portion having a direction of extension parallel to said axis, said second cavity portion also having a direction of extension generally parallel to said axis, with said second cavity portion extending further in said direction from said first cavity portion so as to extend in said direction beyond where the seal engages said sealing surface.

There is further disclosed herein a container within which a food product is to be processed, the container including:
a hollow body providing a chamber to receive the product and within which the product is processed, the body having a rim portion surrounding a body top opening;
a removable lid sealingly associated with the rim portion to close the top opening, the lid having:
  a base sealingly associated with the rim portion, the base having a base opening providing access to the chamber and a sealing surface surrounding the base opening,
  a removable valve assembly located in the base opening and sealingly associated with the base to close the base opening, the valve assembly including:
    a main part associated with the base to removably secure the valve assembly to the base in the base opening,
    an air opening in the main part providing for air flow from the chamber to the exterior of the container,
    a valve mounted in the main part and operatively associated with the air opening to close the air opening to at least inhibit air flow from the exterior of the container to said chamber, but permitting air flow from said chamber to the exterior, and wherein
    the container provides passages connecting the air opening with said chamber, with said passages providing a tortuous path along which air changes direction in travelling to said air opening.

Preferably, said passages lead to a chamber downstream of said valve.

BRIEF DESCRIPTION OF DRAWINGS

Preferred forms of the present invention will now be described by way of example with reference to the accompanying drawings wherein:

FIG. 1 is an isometric view of a container for a blender;

FIG. 2 is a schematic parts exploded isometric view of the container of FIG. 1;

FIG. 3 is a schematic parts exploded isometric view of a lid of the container of FIG. 1;

FIG. 4 is a schematic top plan view of the container of FIG. 1;

FIG. 5 is a schematic sectioned side elevation of an upper portion of the container as shown in FIG. 4 sectioned along the line 5-5;

FIG. 6 is a schematic sectioned side elevation of an upper portion of the container as shown in FIG. 4 sectioned along the line 6-6;

FIG. 7 is a schematic isometric view of an upper portion of the container as shown in FIG. 4 sectioned along the line 7-7;

FIG. 8 is a schematic top plan view of portion of the lid of the container of FIG. 1;

FIG. 9 is a schematic sectioned side elevation of the portion of FIG. 8 sectioned along the line 9-9;

FIG. 10 is a schematic sectioned side elevation of the portion of FIG. 8 sectioned along the line 10-10;

FIG. 11 is a schematic isometric view of the portion of FIG. 8;

FIG. 12 is a schematic top isometric view of a valve assembly of the container of FIG. 1;

FIG. 13 is a schematic bottom isometric view of the valve assembly of FIG. 12;

FIG. 14 is a schematic parts exploded isometric view of the valve assembly of FIG. 12;

FIG. 18 is a schematic sectioned side elevation of the valve assembly as shown in FIG. 15 sectioned along the line 18-18;

FIG. 19 is a schematic sectioned plan view of the valve assembly as shown in FIG. 16 sectioned along the line 19-19;

FIG. 20 is a schematic enlarged view of the portion 20 of FIG. 19;

FIG. 21 is a schematic isometric view of a main part of the valve assembly of FIG. 12;

FIG. 22 is a schematic side elevation of the main part of FIG. 21;

FIG. 23 is a bottom plan view of the main part of FIG. 21;

FIG. 24 is a schematic top plan view of the main part of FIG. 21;

FIG. 25 is a schematic top plan view of the main part of FIG. 21;

FIG. 26 is a schematic side elevation of the main part of FIG. 25;

FIG. 27 is a further schematic side elevation of the main part of FIG. 25;

FIG. 28 is a schematic bottom plan view of the main part of FIG. 25;

FIG. 29 is a schematic sectioned side elevation of the main part as shown in FIG. 25 sectioned along the line 29-29;

FIG. 30 is a schematic top isometric view of the main part as shown in FIG. 25;

FIG. 30b is a schematic side elevation of the valve assembly of FIG. 30a; and

FIG. 31 is a schematic sectioned side elevation of a blender having the container of FIG. 1.

DESCRIPTION OF EMBODIMENTS

Figure 15:
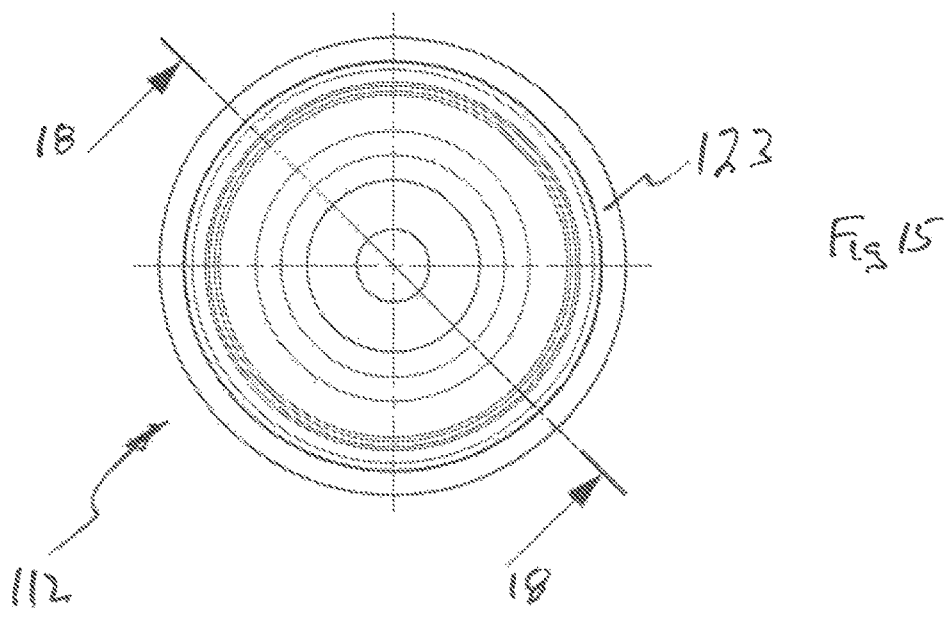
FIG. 15 is a schematic top plan view of the valve assembly of FIG. 12.
Figure 16:
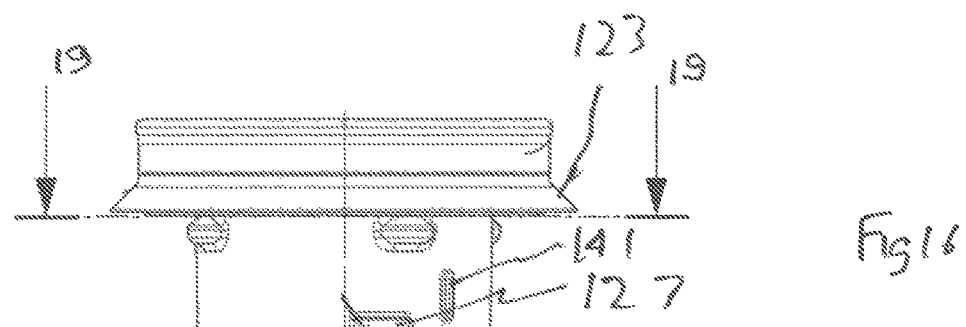
FIG. 16 is a schematic side elevation of the valve assembly of FIG. 15.
Figure 17:
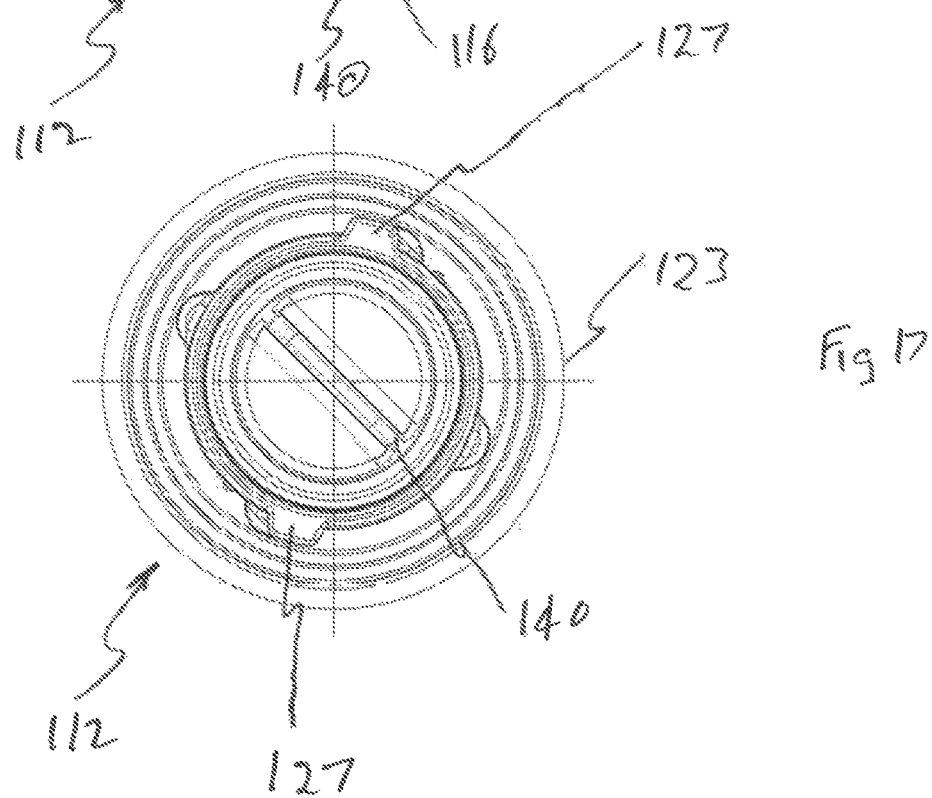
FIG. 17 is a schematic bottom plan view of the valve assembly of FIG. 15.

In the accompanying drawings there is schematically depicted a container 100 within which food can be processed. As a particular example, the container 100 may be a container for a blender 160 or other food processing apparatus within which a food product is engaged and processed in some form by a blade assembly 162 rotatably supported at the lower end of the body 101. The blade assembly 162 is rotatably driven by a drive assembly 161 that includes a motor 163.

The container 100 includes a hollow body (jug) 101 having a handle 102 and a base 103 that engages the drive assembly 161 for the food processor (blender) 160.

The body 101 has an upper rim portion 104 that provides a pouring lip 105.

The rim portion 104 surrounds a top opening 106 that is closed by means of a removable lid 107.

The lid 107 includes a seal 108 that sealingly connects the lid 107 with the body 101 to close the top opening 106. The seal 108 sealingly engages the internal wall 109 of the body 101.

The body 101 has an interior 110 surrounded by the wall 109. A food product to be processed is delivered to the interior 101 where it is engaged by blades or other apparatus that are motor driven by a food processor base.

The lid 107 is an assembly including a base 111 and a valve assembly 112. The seal 108 is attached to a flange 113 of the base 111. The flange 113 depends from an upper wall 114 of the base 111.

The upper wall 109 surrounds a generally central opening 115 within which the valve assembly 112 is located.

In this embodiment, the container 100 has a generally central upright axis 116, with the opening 115 being generally circular, and the opening 106 being generally circular apart from the lip 105. The wall 109 is generally circular in configuration where it is engaged by the seal 108.

The base 111 has a further flange 117 that depends from the wall 114 and is generally circular in configuration like the flange 113.

The flange 117 provides a pair of slots 118, on opposite sides of the axis 116, that extend generally parallel to the axis 116. Also provided by the flange 117 are locating projections 119 providing recesses 120.

The lid 107 is also provided with a grip 121 to be engaged by a user to assist in removing the lid 107 from the body 101.

The valve assembly 112 includes a main part 122 that is generally circular in configuration and has a peripheral wall 124. Secured to the peripheral wall 124 is a seal 123 that sealingly engages the surface 157 of the wall 114, when the valve assembly 112 is located in the opening 115 to close the opening 115.

Sealingly connected to the main part 122, with the aid of an induction weld wire ring 125, is a sleeve 126. The sleeve 126 is generally cylindrical in configuration and has as its axis the axis 116. The sleeve 126 extends in the direction of the axis 116 inwardly of the opening 115.

The sleeve 126 has a pair of outwardly extending projections 127 that are located so as to be received within the slots 118 when the cap assembly 112 is inserted in the opening 115. Once the projections pass through the slots 118, the lid 107 is moved angularly about the axis 116 to secure the lid to the body 101. With particular reference to FIGS. 6 and 7, there is a cavity 156 between the flange 117 and 128 that leads to the connection between the seal 123 and surface 157. The cavity 156 can communicate with the interior 110 by means of apertures 152. The apertures 152 are located between the projections 127, when the projections 127 engage the lower annular end surface of the flange 117, when the valve assembly 112 is moved angularly after the projections 127 pass through the slots 118. The cavity 156 includes a first cavity portion 151 directly communicating with the apertures 152, and a second cavity portion 153. The cavity portions 151 and 153 are generally annular in configuration, with the cavity portion 151 having a width (extending generally radially) relative to the axis 116, that is less than the width (in a radial direction) of the cavity 153. Accordingly, liquid propelled towards the openings 152 enters the first passage portion 151 to be directed to the second cavity portion 153. Since the cavity portion 153 is larger, the kinetic energy of the liquid is dissipated, thereby inhibiting liquid being propelled towards the junction of the seal 123 and surface 157, and ultimately keep the seal 123 adjacent to the surface 157 and restrict the liquid from escaping. If the blending forces are high enough however, the seal 123 will deform to release dangerous pressure build up inside the jug 101, but under normal blending conditions the seal 123 restricts the liquid from escaping.

As the cavity portions 151 and 153 are aligned above the openings 152, the portions 151 and 153 can drain back into the interior 110.

The cavity portion 153 extends further in the direction 135 beyond where the seal 123 engages the surface 157.

The main part 122 includes a generally cylindrical flange 128, that is located internally of the sleeve 126 so as to substantially enclose a chamber 129.

The main part 122 also has a transverse wall 130 from which the sleeve 126 and flange 128 depend. The wall 130 has a generally central opening 131 that is closed by a resilient valve member 132. The valve member 132 has an anchor portion 133 that fixes the valve 132 to the wall 130. The valve member 132 also has a resiliently deflectable annular flange 134 that closes the opening 131, but is resiliently deflectable in the direction 135 to provide for the passage of air through the passage 131 in the direction 135. The flange 134 is resiliently urged against the surface 136 of the wall 130 to close the opening 131 so as to at least inhibit, and most preferably prevent, the passage of air in the reverse direction to the direction 135 back through the opening 131.

Mounted on the flange 128 so as to substantially close the chamber 129 is a baffle member 137. The baffle member 137 includes an annular flange 138 engaged with the flange 128 so as to be mounted thereon. The baffle member 137 also includes a transverse wall 139 from which there depends a baffle 140. The baffle 140 projects into the interior 110.

The sleeve 126 also has a pair of projections 141 that locate within the recesses 120 of the flange 117 when the valve assembly 112 is correctly located in the opening 115, in particular, the projections 127 are inserted in the slots 118 until the projections 127 pass therethrough to provide for angular movement of the cap assembly 112 in the direction 142 angularly about the axis 116.

The flange 128 is provided with a pair of "coupled L shaped" slots 143 that receive projections 144 of the baffle member 137, so that the baffle member 137 is secured to the main part 122. A bayonet fitting may also be used. Barbs 145 of the flange 128 engage barbs 146 of the baffle member 137 to at least inhibit removal of the baffle member 137, especially during vibration of the container 100 during operation.

Relative angular movement of the projections 144 about the axis 116 provides for insertion of the projections 144 in the slots 143, while the barbs 145 and 146 inhibiting reverse rotation and removal of the baffle member 137. However, the valve assembly can be disassembled for cleaning purposes.

The baffle member 137 is also provided with a plurality of small recesses 147 that provide for air flow between the interior 110 and the chamber 129 and therefore the exterior via the opening 131, when the resilient flange 134 is deflected away from the surface 136.

The baffle member 137 also has an annular flange 148 that projects towards the sleeve 126, but provides a gap 149 between the sleeve 126 and the flange 148 to provide for the passage of air through the gap 149, for delivery to the recesses 147. From the recesses 147, air passes down between the flange 138 and flange 128, to enter the chamber 129 from where it can exit via the opening 131, when the flange 134 is deflected from the surface 136. The gap 149 is preferably 0.4 mm to 0.8 mm, most preferably about 0.6 mm.

Figure 30A:
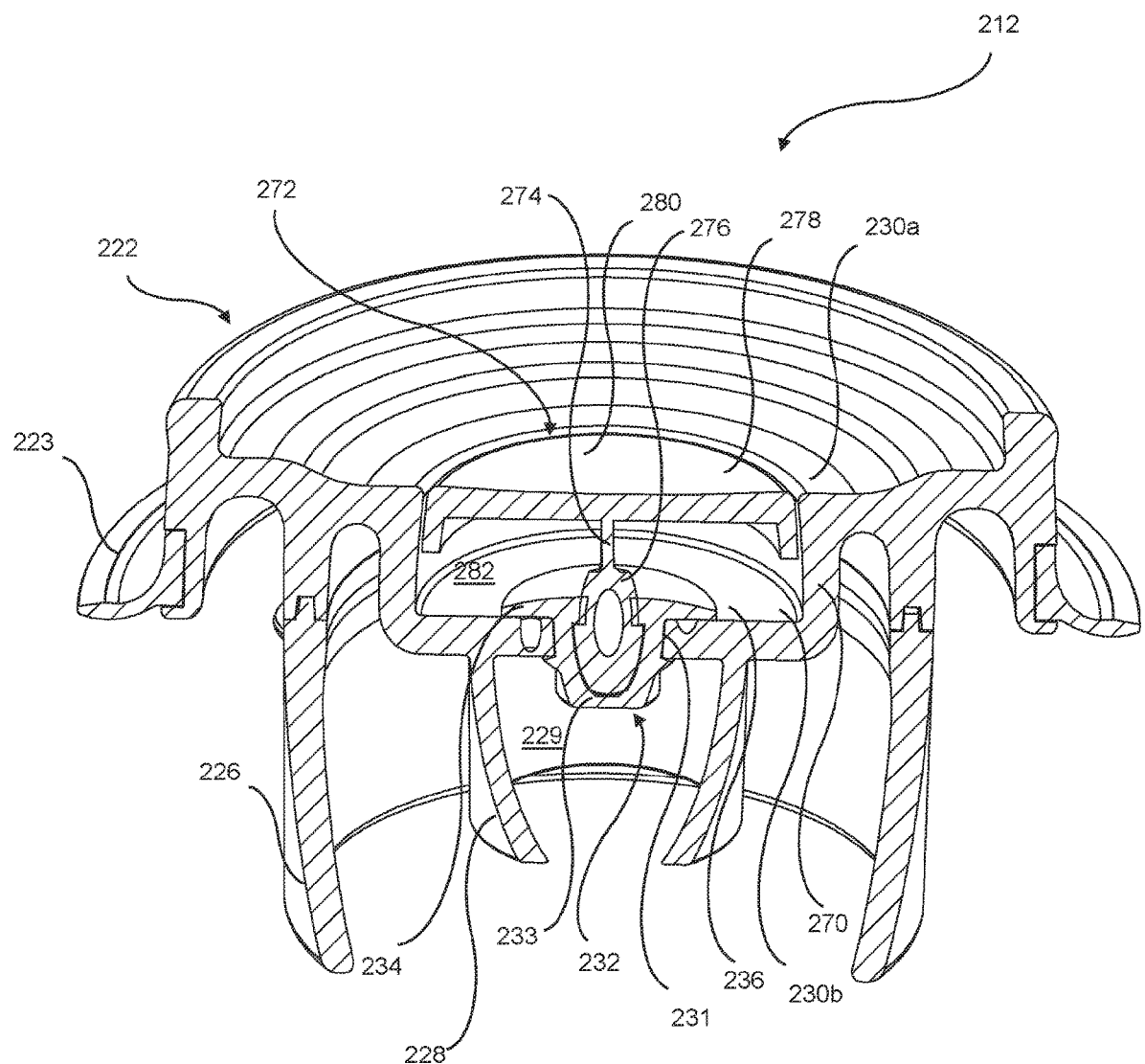
FIG. 30a is a schematic sectioned side elevation of a valve assembly according to an alternative embodiment.
Figure 30B:
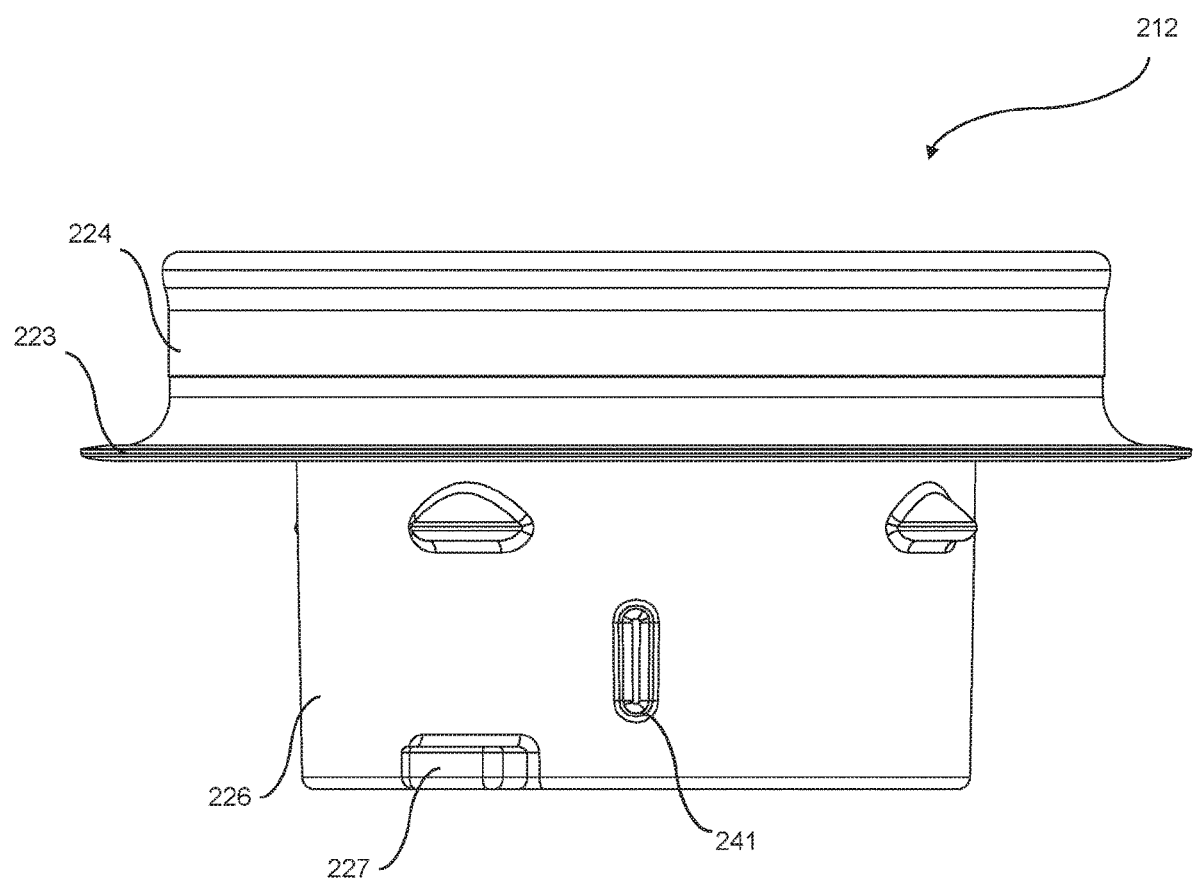

A valve assembly 212 according to an alternative embodiment is depicted in FIGS. 30a and 30b. The valve assembly 212 is similar to that of the valve assembly 112. In particular, the valve assembly 212 includes a main part 222 that is generally circular in configuration and has a peripheral wall 224. Secured to the peripheral wall 224 is a seal 223 that sealingly engages the surface 157 of the wall 114, when the valve assembly 212 is located in the opening 115 to close the opening 115.

Sealingly connected to the main part 222, with the aid of an induction weld wire ring (not shown), is a sleeve 226. The sleeve 226 is generally cylindrical in configuration and has as its axis the axis 116. The sleeve 226 extends in the direction of the axis 116 inwardly of the opening 115.

The sleeve 226 has a pair of outwardly extending projections 227 that are located so as to be received within the slots 118 when the valve assembly 212 is inserted in the opening 115. Once the projections pass through the slots 118, the valve assembly 212 is moved angularly about the axis 116 to secure the valve assembly 212 to the base 111.

The main part 222 includes a generally cylindrical flange 228, that is located internally of the sleeve 226 so as to substantially enclose a chamber 229.

The main part 222 also has a first transverse wall 230a from which the sleeve 226 depends and a second transverse wall 230b from which the flange 228 depends. The first transverse wall 230a is spaced upwardly from the second transverse wall 230b. A side wall 270 extends between the first and second transverse walls 230a, 230b. The second transverse wall 230b has a generally central opening 231 that is closed by a resilient valve member 232. The valve member 232 has an anchor portion 233 that fixes the valve member 232 to the second transverse wall 230b. The valve member 232 also has a resiliently deflectable annular flange 234 that closes the opening 231, but is resiliently deflectable in the direction 135 to provide for the passage of air through the opening 131 in the direction 135. The flange 234 is resiliently urged against the surface 236 of the second transverse wall 230b to close the opening 231 so as to at least inhibit, and most preferably prevent, the passage of air in the reverse direction to the direction 135 back through the opening 231.

The valve assembly 212 further includes a cap member 272 providing a stem portion 274. At one end of the stem portion 274 is an anchor portion 276 to fix the cap member 272 to the valve member 232. At the other end of the stem portion 274 is a top portion 278 having a top surface 280 generally planar with the first transverse wall 230a. The top portion 278, the side wall 270 and the second transverse wall 230b surround a chamber 282.

The sleeve 226 also has a pair of projections 241 that locate within the recesses 120 of the flange 117 when the valve assembly 212 is correctly located in the opening 115, in particular, the projections 227 are inserted in the slots 118 until the projections 227 pass therethrough to provide for angular movement of the cap assembly 212 in the direction 142 angularly about the axis 116.

In operation of the above container 100, a source of reduced air pressure is applied to the volume 150 of the valve assembly 122, with a difference in air pressure across the flange 134 causing deflection of the flange 134 in the direction 135 to provide for air flow through the opening 131. Air then passes from the interior 110, through the gap 149 and between the flanges 128 and 138, to then pass through the chamber 129 to exit via the opening 131. Upon removal of the source, the flange 134 closes the opening 131.

Air passing from the interior 110 to the opening 131 is inhibited taking with it liquid from the interior 110. As air passes from the interior 110, the liquid accumulates in the chamber 129. In particular, air is caused to follow a tortuous path, with liquid prevented from exiting the valve assembly 122 and reaching the vacuum device. Once entering the chamber 129, any kinetic energy of the liquid is at least partly dissipated to thereby further aid inhibiting the exiting of liquid (water) from leaving the valve assembly 122.

With particular reference to FIG. 18, there is a passage 154 between the sleeve 126 and flange 138 that includes the gap 149. The passage 154 communicates with a further passage 155 via the recesses 147, with the passage 155 then communicating with the chamber 129. Accordingly, air passing from the interior 110, to the exterior, must pass along the passage 151 in the direction 135, and then reverse direction to go along the passage 155 before reaching the chamber 129. The passages 154, 155 and gap 149 provide a tortuous path for the air, thereby inhibiting the delivery of liquid to the chamber 129, and ultimately to the chamber 129.

The above described preferred embodiment has a number of advantages including inhibiting liquid passing the seal 123 by dissipating the kinetic energy of any liquid being propelled along the cavity 156.

A further advantage of the above described preferred embodiments is having air pass along a tortuous path before being delivered to the valve 132, thereby inhibiting the delivery of liquid to the chamber 129 immediately downstream of the valve 132.

The invention claimed is:

1. A container within which a food product is to be processed, the container including:
   a hollow body providing an interior chamber to receive the product and within which the product is processed, the body having a rim portion surrounding a body top opening;
   a removable lid sealingly associated with the rim portion to close the top opening, the lid having:
      a base sealingly associated with the rim portion, the base having a base opening providing access to the chamber and a sealing surface surrounding the base opening,
      a removable valve assembly located in the base opening and sealingly associated with the base to close the base opening, the valve assembly including:
         a main part associated with the base to removably secure the valve assembly in the base opening,
         a seal mounted on the main part and engaging the sealing surface,
         an air opening in the main part providing for air flow from the chamber to exterior of the container,
         a valve operatively associated with the air opening to close the air opening to at least inhibit air flow from exterior of the container to said chamber but permit air flow from the chamber to the exterior, and wherein
      a cavity is provided between the base and main part, leading to said seal, with the cavity including a first cavity portion and a second cavity portion, with the first cavity portion being configured relative to the second cavity portion to at least partly dissipate kinetic energy of liquid being propelled from the interior into the cavity.

2. The container of claim 1 wherein the first cavity portion has a transverse width, and the second cavity portion has a transverse width, with the transverse width of the second cavity portion being greater than the transverse width of the first cavity portion.

3. The container of claim 1 wherein the second cavity portion has a volume greater than the first cavity portion.

4. The container of claim 1 wherein the seal engages said sealing surface laterally of the second cavity portion.

5. The container of claim 1 wherein the container has a generally central longitudinal axis, with said first cavity portion having a direction of extension parallel to said axis, said second cavity portion also having a direction of extension generally parallel to said axis, with said second cavity portion extending further in said direction from said first cavity portion so as to extend in said direction beyond where the seal engages said sealing surface.

6. The container of claim 1 wherein the container provides passages connecting the air opening with said chamber, with said passages providing a tortuous path along which air changes direction in travelling to said air opening.

7. The container of claim 6 wherein said passages lead to a second chamber downstream of said valve.

8. A container within which a food product is to be processed, the container including:
   a hollow body providing a chamber to receive the product and within which the product is processed, the body having a rim portion surrounding a body top opening;
   a removable lid sealingly associated with the rim portion to close the top opening, the lid having:
      a base sealingly associated with the rim portion, the base having a base opening providing access to the chamber and a sealing surface surrounding the base opening,
      a removable valve assembly located in the base opening and sealingly associated with the base to close the base opening, the valve assembly including:
         a main part associated with the base to removably secure the valve assembly to the base in the base opening,
         an air opening in the main part providing for air flow from the chamber to the exterior of the container,
         a valve mounted in the main part and operatively associated with the air opening to close the air opening to at least inhibit air flow from the exterior of the container to said chamber, but permitting air flow from said chamber to the exterior, and wherein
      the container provides passages connecting the air opening with said chamber, with said passages providing a tortuous path along which air changes direction in travelling to said air opening.

9. The container of claim 8 wherein said passages lead to a second chamber downstream of said valve.

* * * * *